July 16, 1957 D. R. DE BOISBLANC 2,799,136
FLAME DETECTION AND CONTROL IN AIRCRAFT ENGINES
Filed April 9, 1951 2 Sheets-Sheet 1

INVENTOR.
D. R. DE BOISBLANC
BY Hudson & Young
ATTORNEYS

July 16, 1957  D. R. DE BOISBLANC  2,799,136
FLAME DETECTION AND CONTROL IN AIRCRAFT ENGINES
Filed April 9, 1951  2 Sheets-Sheet 2

INVENTOR.
D. R. DE BOISBLANC
BY Hudson & Young
ATTORNEYS

United States Patent Office 2,799,136
Patented July 16, 1957

2,799,136

FLAME DETECTION AND CONTROL IN AIRCRAFT ENGINES

Deslonde R. de Boisblanc, Bartlesville, Okla., assignor to Phillips Petroleum Company, a corporation of Delaware Application April 9, 1951, Serial No. 220,114

3 Claims. (Cl. 60—35.6)

This invention relates to flame control mechanism. In one aspect it relates to flame detection and control means for use in both reciprocating and jet-type aircraft engines. In another aspect it relates to a method of and apparatus for regulating combustion chambers.

In various jet-type aircraft engines considerable difficulty has been encountered in attempting to detect the presence of flames in particular regions of said engines. If flame is permitted to extend beyond the normal combustion chamber, considerable damage may result either from said flame impinging upon elements not capable of withstanding high temperature and/or chemical reactions of reactive gases present and created by said flame, or from the inherent danger of an explosion taking place either within or outside said combustion chamber. While some attempt has been made in the prior art to detect the presence of these flames by the use of thermocouples or thermostat devices, the most common difficulty encountered is that of providing a sensing element capable of providing a rapid response. This is true because thermocouple and thermostat devices measure temperature rather than the presence of a flame and hence do not provide a warning signal until the detecting element reaches a predetermined temperature. A flame contains reactive gases which can erode away rapidly some metallic, or even some non-metallic parts which would not erode at all at the temperature of the flame alone. An intermittent bath of flame can erode such parts very quickly. A second difficulty encountered in constructing control mechanism is that of providing a sensing element capable of withstanding high temperatures present in jet-type engines. It is toward providing satisfactory flame indicating and control mechanism for use in aircraft engines that the present invention is primarily directed.

It is, accordingly, an object of this invention to provide apparatus for detecting and controlling flame in aircraft engines.

Another object is to prevent flame impingement upon the turbine blades of a turbojet aircraft engine.

A further object is to detect the presence of and compensate for flame flash-back in ram jet aircraft engines.

A further object is to detect the presence of and compensate for flame in an augmenter of a reciprocating-type aircraft engine.

A still further object is to provide flame detection and control apparatus which is rapid in operation, reliable in result, of simplified rugged construction, and which is capable of withstanding high temperatures.

Various other objects, advantages, and features of this invention should become apparent from the following detailed description taken in conjunction with the accompanying drawings, having like reference numerals designating similar parts throughout, illustrating a preferred embodiment of this invention in which.

Figure 6:
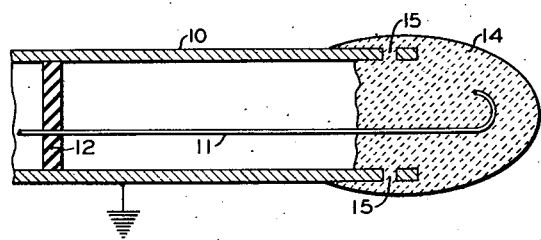
Figure 6 shows an appropriate flame sensing probe for use as the flame detector in Figures 1 through 5.

Referring now to the drawings in detail and to Figure 6 in particular, there is shown a flame sensing probe which can effectively be used to indicate the presence of a flame striking the tip of said probe. This probe comprises a metallic casing 10 having a metallic electrode 11 positioned therein and electrically insulated from casing 10 by means of suitable insulating supports such as 12. Electrode 11 is embedded in a tip 14 of ceramic material positioned across one end of casing 10 and making electrical contact therewith. Ceramic tip 14 preferably is constructed of some type of refractory material such as aluminum oxide, which is formed in a paste by mixing powdered aluminum oxide with water. The paste is molded in the form of a tip around casing 10 and then sintered. This ceramic probe is constructed in a manner essentially as described in my copending application, Serial No. 220,116, filed Apr. 9, 1951, now Patent No. 2,768,266, issued October 23, 1956. The operation of the probe as a flame sensing element can be explained as follows.

In any given electrical resistance element, such as tip 14, having two electrodes 10 and 11 connected thereto, one of which is grounded (electrode 10), there exists a constant distribution of potential at all points throughout said resistance element 14. If a charged particle, such as ions produced by the reaction of a flame, impinges upon the surface of said resistance element 14 then the constant potential condition is disrupted resulting in a small current flowing in the element until all points therein are once again at zero or at ground potential. During that time when current is flowing, the region of the resistance element in the neighborhood of the ungrounded electrode 11 will exhibit a potential variation with respect to grounded electrode 10 which depends upon the magnitude of the charge of the particle striking said element, the resistance of the element, and the geometric relation of said ungrounded electrode with respect to the second grounded electrode. This potential variation, after amplification, can be measured thereby giving an indication of flame striking said probe. This phenomenon is utilized in accordance with the present invention to actuate suitable control means for correcting some preselected combustion variable thereby reducing or eliminating flame in the region of said sensing probe.

Figure 1:
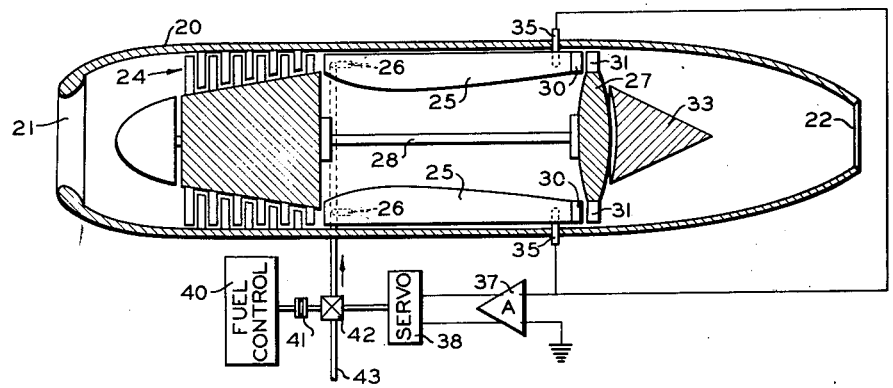
Figure 1 is a schematic view, shown partially in section, illustrating flame detection and control mechanism for use in turbojet aircraft engines.

In Figure 1 there is shown a schematic representation of a turbojet aircraft engine which comprises a casing or housing 20 of essentially circular cross section having an air intake 21 and discharge nozzle 22. Proceeding from the inlet end to the outlet end, casing 20 contains an air compressor 24, a plurality of combustion chambers 25 arranged annularly around the engine at equally spaced intervals, and a gas turbine 27. Air compressed by the compressor 24 is used to support combustion of a liquid fuel injected into combustion chambers 25 through fuel nozzles 26, and the greatly increased volume of resulting heated gases is fed through turbine 27 and thence outwardly through discharge nozzle 22. The purpose of turbine 27 is to drive air compressor 24 by means of shaft 28 connecting the rotor assembly of said turbine with the rotor assembly of said air compressor. Turbine 27 includes a peripheral set of stationary vanes 30 and a movable set of blades 31. Located centrally within the tail pipe of the engine is a discharge air regulating plug 33, which is suspended therein by appropriate structure not shown.

For satisfactory operation of this turbojet engine the fuel-air ratio in combustion chambers 25 must be regulated so that the flame produced in said chambers is not of sufficient length to impinge upon the vanes 30 or blades 31 of turbine 27, since a flame impinging thereupon will reduce the fatigue strength of said metallic vanes and blades. These metallic blades are constructed of an alloy steel which is not capable of withstanding prolonged exposure to flame. Therefore, means must be provided both to detect the presence of any flame which may be impinging upon said blades and to regulate the fuel-air ratio in said combustion chamber thereby preventing the flame from reaching rearwardly to said blades. To provide this control a flame sensing probe 35, which can be of the form shown in Figure 6, is inserted in each of said combustion chambers at a position somewhat forward of vanes 30. Since the casing of probes 35 are held at ground potential, probes 35 can make direct contact with casing 20 of the engine. Any output potential which is developed across flame sensing probes 35 by flame impinging thereupon is applied to the input of amplifier 37 which is an alternating current amplifier having high gain. The output of amplifier 37 is applied to suitable known servomechanism represented by 38 which acts to control the fuel input fed to fuel injection nozzles 26 in combustion chambers 25 through valve 42. Servomechanism 38 can be of the type shown in Electronic Control Handbook, Batcher and Moulick, Caldwell-Clements, Inc., New York, New York, 1946, page 298, for example. The output signal from amplifier 37 can be rectified and compared with a reference voltage in the same manner as the thermocouple voltage is compared with the potentiometer reference voltage in said Electronic Control Handbook. The voltage difference drives a reversible balance motor which in turn controls valve 42. The fuel input to combustion chambers 25 normally is regulated by fuel valve control mechanism shown at 40. As illustrated, valve 42 in fuel line 43 is actuated by fuel control mechanism 40 through a friction clutch 41. As long as flame is not striking probes 35 the output of amplifier 37 remains essentially zero and servomechanism 38 does not influence fuel valve 42. However, should flame impinge upon a probe 35, then an electrical signal will be generated, which upon amplification by amplifier 37 will drive servomechanism 38 in a manner so as to override the normal fuel control mechanism 40 through friction clutch 41, thereby independently regulating the fuel input to combustion chambers 25 in such a manner as to reduce the flame length within said chambers. For example, should excessive fuel be supplied to combustion chambers 25 by fuel control 40, the resulting electrical signal from amplifier 37 will actuate servomechanism 38 to close valve 32 as is necessary to shorten the flame length in chambers 25. Amplifier 37 should be biased so as to reject the small noise signal which always is present in said amplifier due to thermal noise voltages generated in probes 35 and in amplifier 37 itself. This thermal noise effect, however, is considerably smaller than the electrical signal generated by flame impinging upon probes 35 so that said probes function only as flame sensing elements.

Figure 2:
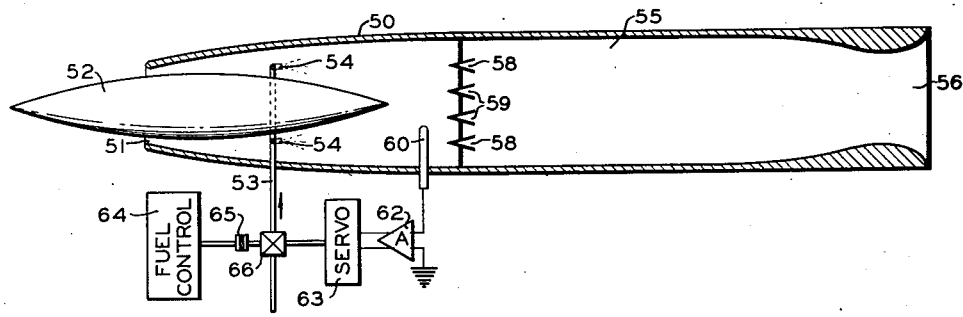
Figure 2 shows a schematic view of flame detection and fuel control mechanism for use in ram jet aircraft engines.

In Figure 2 there is shown a preferred form of flame control mechanism for use in a ram jet aircraft engine. Atmospheric air enters casing 50 of the engine through openings 51 located between casing 50 and a bullet type air spike 52 positioned therein. Air entering the engine then passes rearwardly past fuel nozzles 54 located annularly about spike 52; and the resulting fuel-air mixture then passes into combustion chamber 55 from which exhaust gases produced by said combustion are discharged from the engine through exit nozzle 56. Since in a ram jet engine large quantities of fuel must be burned efficiently in a small space without excessive pressure drop, flame holders such as 58 and 59 are provided. These flame holders, as shown, are in the form of V-shaped rings mounted within casing 50 of said engine. Within these V-shaped rings the velocity of the fuel-air mixture is extremely low so that combustion readily takes place in this region, thereby reducing the chance of "blow-out" should the flow velocity entering combustion chamber change. Thus, combustion generally takes place in the region designated by reference numeral 55 as long as the fuel-air mixture retains the desired ratio as determined by the design of the particular engine. However, should the fuel-air ratio vary from its proper value, there is danger of what is known as "flash-back." Flashback is the condition of combustion taking place behind fuel holders 58 and 59, that is, in the region between said fuel holders and said fuel injection nozzles 54. Since the flash-back is indicative that the fuel-air ratio no longer has the desired value for efficient operation of the engine, means should be provided for adjusting the fuel-air ratio to a correct value so as to restore combustion to region 55. To provide this desired correction, there is inserted a flame sensing probe 60 within the region between fuel injection nozzle 54 and flame holders 58 and 59, as illustrated. Electrical signals generated by flame impinging upon probe 60 is amplified by amplifier 62, the output of which operates servomechanism 63, which in turn controls fuel line 53, in a manner similar to the control of fuel line 43 by servomechanism 38 in Figure 1. Fuel control mechanism 64 corresponds to like mechanism 40 in Figure 1 while friction clutch 65 is similar to clutch 41, also in Figure 1. Thus, if flame is present in the region occupied by probe 60, the fuel input is adjusted so that combustion once again takes place in region 55 rather than in the region behind flame holders 58 and 59.

Figure 3:
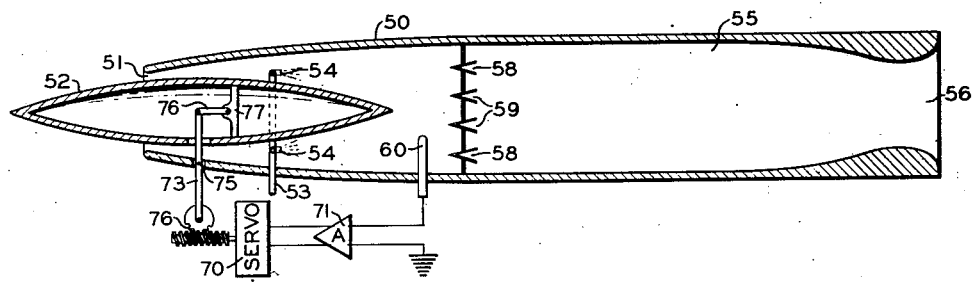
Figure 3 shows a schematic view of flame detection and air intake diffuser control for use in ram jet aircraft engines.

In Figure 3 there is shown a second ram jet engine similar in construction to the engine shown in Figure 2 and having like parts designated by like reference numerals. Probe 60 of Figure 3 performs the same function as does probe 60 in Figure 2. However, in Figure 2 the fuel-air ratio is corrected by varying the input air to said engine rather than the input fuel. This correction is accomplished by moving spike 52 longitudinally with respect to engine casing 50 so as to vary the size of the air inlet nozzle 51. Suitable means for accomplishing this movement include servomechanism 70 actuated by the output of amplifier 71, the input of which comprises electrical voltage fluctuations generated by flame impinging upon probe 60. Servomechanism 70 drives lever 73 by worm gears 76, said lever 73 being hinged at pivot 75 on engine casing 50 and secured to spike 52 through rods 76 and 77. Rotation of lever 63 about pivot 75 adjusts the longitudinal position of diffuser 52 within casing 50 of the ram jet engine, thereby increasing or decreasing the size of air inlet openings 51 as may be required to properly adjust the fuel-air ratio in combustion chamber 55.

Figure 4:
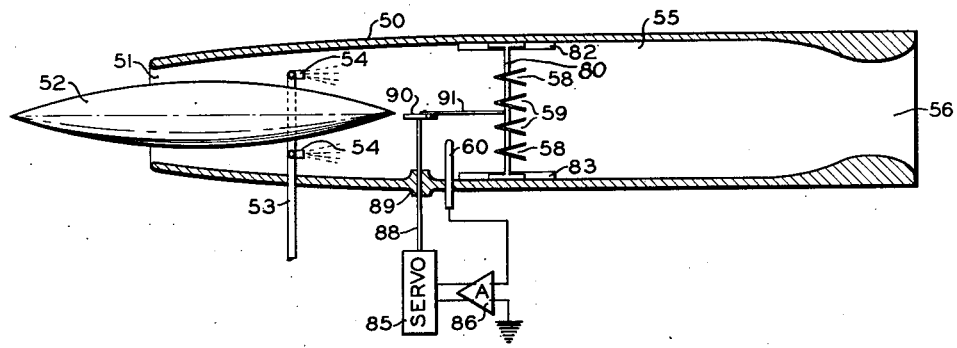
Figure 4 shows a schematic view of flame detection and flame holder position control for use in ram jet aircraft engines.

In Figure 4 a ram jet engine similar to that shown in Figures 2 and 3 is illustrated in connection with a third type of combustion control mechanism. Flame holders 58 and 59 are mounted on a frame 80 which is adapted to slide longitudinally on positioning members 82 and 83, which are in turn secured to casing 50 of the ram jet engine. Servomechanism 85 controlled by the output of amplifier 86 rotates drive rod 88 which is adapted for rotation in flanged portion 89 of casing 50. Attached to the end of rod 88 within said engine is a cam 90 to which is secured a longitudinal rod 91 connected also to frame 80. Rotation of shaft 88 in response to flame impinging upon probe 60 tends to move flame holders 58 and 59 longitudinally within casing 50 so as to adjust the position of combustion chamber 55, thereby preventing flash-back behind the flame holders.

Figure 5:
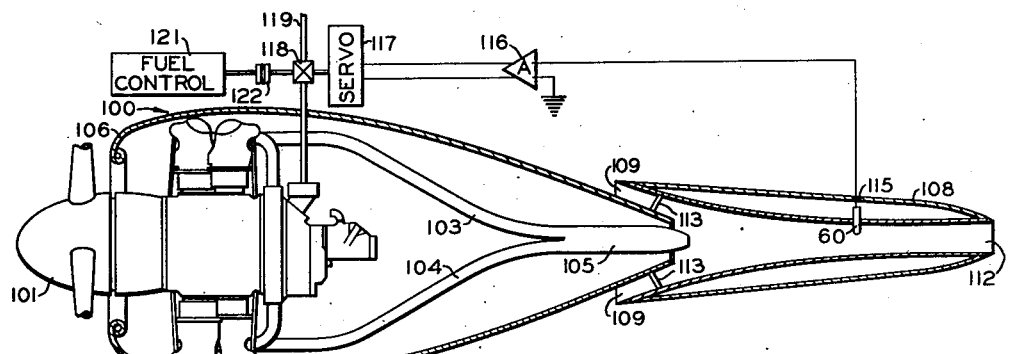
Figure 5 shows a schematic view of flame detection and fuel line control for use in the augmenter of a reciprocating aircraft engine.

In Figure 5 there is illustrated flame detection and control mechanism for use in reciprocating type aircraft engines employing an augmenter to give added thrust thereto. A radial air cooled internal combustion engine conventionally employed for the propulsion of aircraft is represented generally by 100, said engine driving a propeller assembly 101. Each engine cylinder, or small group of cylinders, is provided with an individual exhaust conduit, two of which are indicated as 103 and 104. These individual conduits extend rearwardly of the engine 100 and may be grouped as a cluster of individual conduits or may merge into a common rearwardly extending exhaust pipe or stack 105, as illustrated. Engine 100 is shown as being enclosed within a streamlined nacelle 106. An augmenter 108 is positioned rearwardly of exhaust pipe 105 wherein hot exhaust gases from engine 100 are mixed with atmospheric air which enters augmenter 108 by means of such openings as 109 and 110 positioned between nacelle 106 and augmenter 108. This mixture of exhaust gases and atmospheric air is discharged rearwardly through exhaust 112 giving added thrust to engine 100. Augmenter 108 can be fastened to nacelle 106 by means of suitable struts 113, as shown.

Since the exhaust gases from engine 100 often contain unburned fuel gas if the fuel mixture in engine 100 is too rich, there is always danger of an explosion taking place within augmenter 108 if unburned fuel is present therein and should flame happen to enter said augmenter from the exhaust of said engine. To guard against this possibility a flame sensing probe 60 is positioned within augmenter 108. While the casing of said probe is grounded by contact with augmenter 108, the center electrode of said probe must be electrically insulated from said augmenter by insulating seal 115, as shown. The electrical potential generated across probe 60 by flame impinging thereupon is amplified by amplifier 116, the output of which actuates suitable servomechanism 117 to control valve 118 on fuel line 119 in a manner similar to that described in connection with Figures 1 and 2. The normal fuel control mechanism 121 regulates valve 118 through friction clutch 122 as previously described. Servomechanism 117 serves to override fuel control mechanism 121 in a manner so as to properly adjust the fuel input to said engine, thereby preventing flame from entering the augmenter of engine 100.

From the above description it should be apparent that there has been provided in accordance with this invention flame control mechanism utilizing an electrical resistance element to detect flame impinging thereupon. This control mechanism is utilized in various forms to regulate combustion rates in aircraft engines to prevent undesired occurrence of flame at various points in said engines. While this invention has been described in connection with preferred forms of control mechanism, for purposes of illustration, it is not intended to be limited thereto.

I claim:

1. In a turbojet aircraft engine including an air compressor, a combustion chamber positioned rearwardly of said compressor and receiving air at one end from said compressor, a gas turbine positioned at the other end of said combustion chamber and adapted to being driven by heated gases from said combustion chamber, and a drive shaft connecting said compressor to said turbine; flame control mechanism comprising, in combination, a flame sensing element positioned rearwardly of said combustion chamber between said turbine and said chamber, and means responsive solely to flame impinging directly upon said flame sensing element for regulating the rate of combustion in said combustion chamber to prevent flame from impinging upon the blades of said turbine.

2. In a turbojet aircraft engine including an air compressor, a combustion chamber positioned rearwardly of said compressor and receiving air at one end from said compressor, a gas turbine positioned at the other end of said combustion chamber and adapted to being driven by heated gases from said combustion chamber, and a drive shaft connecting said compressor to said turbine; flame control mechanism comprising, in combination, a flame sensing electrical resistance element positioned rearwardly of said combustion chamber between said turbine and said chamber, in alternating current amplifier having the input terminals thereof connected across said element to amplify fluctuating electrical signals generated solely by flame impinging directly upon said element, and means actuated by the output signal from said amplifier for regulating the fuel input to said combustion chamber so as to prevent flame from impinging upon the blades of said turbine.

3. The combination in accordance with claim 2 in which the flame sensing element comprises a probe having a metallic casing, a metallic electrode positioned within and electrically insulated from said casing, and a tip of ceramic material positioned across one end of said casing and making electrical contact with said casing and with said electrode, said ceramic tip being positioned between the blades of the turbine and the flame in the combustion chamber.

References Cited in the file of this patent

UNITED STATES PATENTS

| | | |
|---|---|---|
| 2,316,872 | Kernen | Apr. 20, 1943 |
| 2,324,821 | Campbell | July 20, 1943 |
| 2,361,294 | Jones | Oct. 24, 1944 |
| 2,418,867 | Burch | Apr. 15, 1947 |
| 2,463,566 | Saldin | Mar. 8, 1949 |
| 2,538,642 | Gardiner et al. | Jan. 16, 1951 |
| 2,546,415 | Alcock | Mar. 27, 1951 |

FOREIGN PATENTS

| | | |
|---|---|---|
| 618,389 | Great Britain | Feb. 21, 1949 |
| 616,622 | Great Britain | Jan. 25, 1949 |

OTHER REFERENCES

The Review of Scientific Instruments, vol. 20, No. 11; November 1949, article by Garrison and Lawson, pages 785-794.